United States Patent
Bickford et al.

(12)

(10) Patent No.: US 6,427,046 B1
(45) Date of Patent: Jul. 30, 2002

(54) OPTICAL FEEDTHROUGH AND METHOD OF MAKING SAME

(75) Inventors: Gary P. Bickford, Houston; Pete Howard, Bellville, both of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/539,060

(22) Filed: Mar. 30, 2000

(51) Int. Cl.$^7$ .................................................. G02B 6/00
(52) U.S. Cl. ....................................................... 385/138
(58) Field of Search ................................. 385/137, 138

(56) References Cited

U.S. PATENT DOCUMENTS

| | | | |
|---|---|---|---|
| 4,296,996 A | | 10/1981 | Niiro et al. |
| 4,366,713 A | * | 1/1983 | Gilmore et al. ............... 73/618 |
| 4,548,466 A | * | 10/1985 | Evans et al. ................. 385/137 |
| 4,891,640 A | | 1/1990 | Ip |
| 5,061,035 A | * | 10/1991 | Rogers, Jr. ................... 385/115 |
| 5,155,796 A | | 10/1992 | Wasserman et al. |
| 5,177,806 A | | 1/1993 | Abbott et al. |
| 5,588,086 A | | 12/1996 | Fan |
| 5,692,086 A | | 11/1997 | Beranek et al. |
| 6,216,939 B1 | * | 4/2001 | Thackara ................. 228/124.6 |

FOREIGN PATENT DOCUMENTS

| | | |
|---|---|---|
| EP | 0 125 795 A1 | 4/1984 |
| EP | 0 0770893 A2 | 10/1996 |
| GB | 2003294 | 8/1978 |
| GB | 2078995 | 5/1981 |

\* cited by examiner

*Primary Examiner*—Cassandra Spyrou
*Assistant Examiner*—Euncha Cherry
(74) *Attorney, Agent, or Firm*—Wayne I. Kanak; Brigitte L. Jeffery; John J. Ryberg

(57) ABSTRACT

A method of securing and sealing an optical fiber within a bulkhead, the method includes forming a layer of a solder-compatible material over a diffusion barrier covering a metal-clad optical fiber; extending the optical fiber through a metallic housing, with a portion of the layer of solder-compatible material within the housing, the housing and the solder-compatible material defining a gap therebetween; and bridging the gap with a solder to secure the fiber to the housing and to form a pressure-tight seal between the fiber and the housing. In one embodiment, an optical feedthrough includes a metallic housing; a gold-plated optical fiber disposed in the housing, the fiber having a nickel layer disposed thereon and a gold layer disposed over the nickel layer; and a silver-containing solder disposed in the housing and connecting the fiber to the housing, the solder bridging a gap between the metallic housing and the solder-compatible material to form a pressure-resistant seal about the fiber.

22 Claims, 1 Drawing Sheet

OPTICAL FEEDTHROUGH AND METHOD OF MAKING SAME

BACKGROUND

This invention relates to fiber optical feedthroughs, and methods of securing an optical fiber within a bulkhead.

Fiber optical feedthroughs are used for transmitting and receiving data in deep drilling operations, such as drilling for oil wells and gas wells. In these types of operations, the feedthroughs can be exposed to extreme downhole environments having high pressures and high temperatures, e.g., up to 30,000 psi and 300° C. Furthermore, the feedthroughs are commonly exposed to these extreme environments for extended periods of time.

In operation, the feedthroughs are often secured to a bulkhead assembly. Materials, e.g., epoxies, that typically can be used to assemble a feedthrough to a bulkhead may not survive the extreme downhole environment. Even if they can survive the high pressures and temperatures, these materials may survive only for a short period of time.

SUMMARY OF THE INVENTION

We have developed an improved method of securing and sealing a metal-clad optical fiber within a bulkhead, which can result in a seal capable of withstanding extreme temperatures and pressures over an extended period of time. Metal-clad fibers are mechanically robust, and the cladding layer can provide a hermetic seal over the glass fiber. We have realized, in the development of this method, that soldering directly to some metal cladding layers commercially available in optical fibers can result in a diffusion of the cladding material into the solder material. Diffusion of the cladding material exposes the bare glass of the optical fiber. Bare glass can create weak spots on the fiber, thereby making handling difficult, and can make the assembly more susceptible to premature failure due to ingress of moisture and hydrogen. Our method minimizes the exposure of bare glass by providing the fiber with a diffusion barrier over its metal cladding and forming a layer of solder-compatible material over the diffusion barrier, such that the fiber may be securely soldered into a housing without significant alteration (e.g., by diffusion) of the cladding material adjacent the glass core of the fiber.

In one aspect, the invention features a method of securing and sealing an optical fiber within a bulkhead. The method includes forming a layer of a solder-compatible material over a diffusion barrier covering a metal-clad optical fiber; extending the optical fiber through a metallic housing, with a portion of the layer of solder-compatible material within the housing, the housing and the solder-compatible material defining a gap therebetween; and bridging the gap with a solder to secure the fiber to the housing and to form a pressure-tight seal between the fiber and the housing.

Embodiments of the invention may include one or more of the following features. The method further includes placing a solder pre-form in the housing. The method further includes threading the optical fiber through the pre-form. The method further includes forming a second layer of a solder-compatible material in the housing. Bridging the gap includes resistively heating the solder. The method further includes ultrasonically cleaning the fiber and the housing after resistively heating the solder. The method further includes forming a protective layer over the secured optical fiber and housing, by a plating.

In another aspect, the invention features an optical feedthrough having a metallic housing; an optical fiber disposed in the housing, the fiber having, over a length adjacent the housing, a metallic layer covering the optical fiber, a diffusion barrier about the metallic layer, and a layer of a solder-compatible material about the diffusion layer; and a solder disposed in the housing and connecting the fiber to the housing, the solder bridging a gap between the metallic housing and the solder-compatible material to form a pressure-tight seal about the fiber.

Embodiments of the invention can include one or more of the following features. The metallic cladding layer includes gold. The diffusion barrier includes nickel. The solder-compatible material includes gold. The solder includes silver. The solder is connected to a layer of a solder-compatible material on the housing. The solder-compatible material on the housing includes gold. The connected housing and fiber are coated with an exterior protective layer. The protective layer includes gold. The optical feedthrough is adapted to be exposed to at least 20,000 psi of pressure across the solder at 300° C. without leakage.

The resulting feedthrough is resistant to changes in temperature and pressure, and can be constructed to withstand differential pressures greater than 30,000 psi at temperatures up to 300° C. With a post-assembly, gold-plating process, the feedthrough is further resistant to corrosion. The feedthrough can be installed for long periods of time (up to 5–10 years) in industrial environment, and is particularly suitable for use downhole or in sub-sea oilfields. The optical feedthrough also exhibits low optical losses, e.g., less than about 0.3 db, which are not adversely affected by changes in temperature and pressure.

The above-described method of securing and sealing the fiber to the housing is simple, inexpensive, and produces high yield. No stripping of the fiber to bare glass is required during manufacture, which can damage the fiber and make it susceptible to breaking during handling. The gold cladding layer found on some optical fiber is protected from dissolution during soldering by the diffusion barrier. Controlled resistance heating of a solder pre-form avoids heat damage to the fiber. The method can be applied to a wide variety of materials with proper choices of fluxes and solders.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
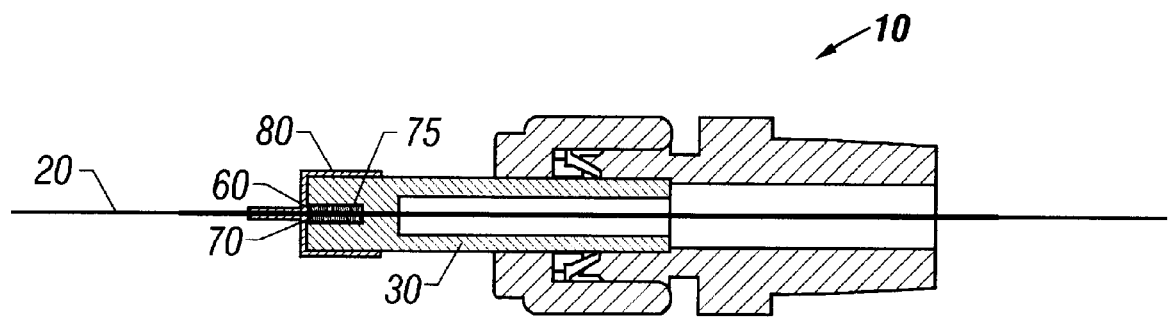
FIG. 1 is a cross-sectional view of an optical feedthrough.
Figure 2:
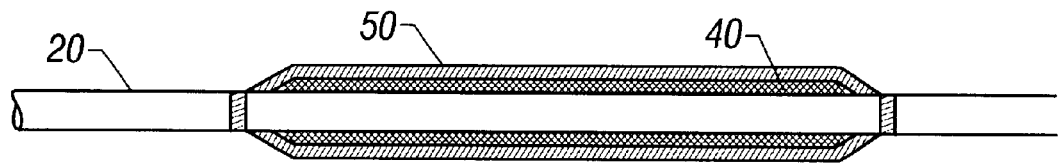
FIG. 2 is an enlarged view of a section of an optical fiber adapted for use in the feedthrough of FIG 1.

Referring to FIGS. 1 and 2, an optical feedthrough 10 includes an optical fiber 20 secured in a housing 30. The fiber 20 is a gold-clad optical fiber having a portion plated with a nickel diffusion barrier 40 and a gold solder-compatible material 50 plated over the diffusion barrier 40. The housing 30 is a gold-plated, stainless steel machined housing. The fiber 20 is secured to the housing 30 by extending the fiber 20 through a bore 90 of a solder pre-form 60 and the housing 30. The solder pre-form 60 is slid into a solder cup area 70 located in the housing 30 and resistively heated until the pre-form melts and bonds the fiber 20 to the housing 30. Finally, a protective layer 80 may be formed over the secured optical fiber and housing, such as by plating with a material which includes gold.

The optical fiber 20 is a gold-plated glass fiber. The fiber is a single mode, step index fiber having a 9 micron core, 125 micron outer diameter cladding, and a 155 micron gold jacket, 100,000 psi tensile strength, commercially available from Fiberguide Industries (New Jersey). The fiber 20 is electroplated over a length of about 3 inches with a layer 40 of nickel, about 0.00050 inch thick. The nickel layer 40 acts as a diffusion layer to restrict the gold on the fiber 20 from dissolving and diffusing away from the glass during resistive heating. The nickel layer 40 is electroplated with a gold layer 50, about 0.001 inch thick. The gold layer 50 acts as a solder-compatible material to provide good bonding between the fiber 20 and the housing 30.

The housing 30 is a stainless steel machined part that has been gold-plated (not shown) to form a second layer of solder-compatible material thereon. The housing 30 is counterbored to form a solder cup area 70, which is tapered at its inner end about a through-hole 75 for receiving the fiber. Tight clearances between the fiber 20 and the through-hole 75 prevent excessive amounts of molten solder from flowing along the fiber during heating, but help draw some solder into the through-hole 75 at the inner end of the solder cup area 70 by capillary action, thereby providing a more robust pressure seal.

Figure 3:
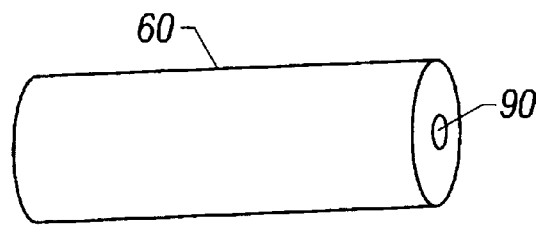
FIG. 3 is an enlarged perspective view of a solder pre-form.

The solder pre-form 60 helps reduce the number of voids in the solder after it has been melted, as describe below. Referring to FIG. 3, the solder pre-form 60 is cylindrically shaped and is composed of silver solder (50% Ag; 20% Cu; 28% Zn; 2% Ni). The cylinder has a length of about 0.19 inch and an outer diameter of about 0.063 inch. The pre-form 60 has a central bore 90, with a diameter of about 0.013 inch, extending along the longitudinal axis of the cylinder.

The recommended procedure for securing and sealing the optical fiber to the housing will now be described. Clean the portion of the fiber 20 having the nickel and gold layer, the housing 30, and the pre-form 60 in isopropyl alcohol and allow the parts to dry. The cleaned parts should not be touched with bare hands after cleaning.

Clamp the housing 30 vertically in a non-marking vise or aluminum V-groove. The housing 30 should not be clamped such that it would act as a heat sink for the solder cup area 70. Using a plastic rod or toothpick, cover the interior wall of the solder cup area 70 completely, but not excessively, with a silver solder flux (Superior Flux & Mfg. Co., Model 601, silver brazing paste flux).

Using tweezers, thread the fiber 20 through the bore 90 of the pre-form 60 and through the housing 30. Slide the pre-form 60 to the solder cup area 70, and push the pre-form 60 in place with a pick, such as a pointed stainless steel dental pick. The fiber should be positioned such that the pre-form 60 is located about the portion of the fiber having the gold solder-compatible material 50. Using a stand, tape one end of the fiber 20 above the housing and the solder pre-form so that the fiber is vertical. Secure a small weight to the other end of the fiber and allow the weight to hang below the housing. The fiber 20 and the housing 30 should be as centered and vertical as possible.

Using a solder station, e.g., American Beauty Resistive Solder Station #105d1 with handset #10567, position soldering electrodes around the housing 30, adjacent of the solder pre-form 60. During the heating process, the flux can force the pre-form 60 out of the housing 30. Thus, while holding the solder pre-form 60 in place with a stainless steel dental pick, resistively heat the solder to approximately 1300° F., being careful not to overheat the fiber. The pick should not contact the fiber 20. Within about ten seconds, the flux will bubble, turn white, and turn clear. Continue to hold the pre-form 60 in place until it melts, and remove the pick. After the pre-form has melted, discontinue heating and allow the feedthrough to cool. Remove the fiber 20 from the stand and detach the weight.

Place the feedthrough 10 in an ultrasonic cleaner filled with hot water for three minutes to remove the flux. The water should be allowed to get into the housing 30 from the unsoldered end. Remove the feedthrough and dry with a light spray of air. The entire feedthrough can be plated with gold to protect it from corrosion damage.

The feedthrough should have no cracks on the housing/solder interface and no major porosity. The gold layer should be continuous throughout the fiber. An inspection for continuity can be performed with an Ohmmeter to verify that no bare glass is present.

It will be understood that various modifications may be made without departing from the spirit and scope of the invention. For example, the fiber can be clad with a material other than gold. Preferably, the cladding material can form a hermetic interface with the fiber, with no pinholes or significant porosity. Preferably, the cladding material is solder-compatible. Similarly, the diffusion barrier can include other materials that allow the solder to bond the fiber to the housing without the dissolution of the underlying cladding material. The solder-compatible material can include other materials that promote good bonding between the fiber and the housing, such as tin or other solders. The housing can be attached to, for example, a tube fitting with a metal-to-metal seal, with O-ring sealing grooves, a flange for a weld, or a bulkhead, e.g., a multi-fiber pressure bulkhead.

Other embodiments are within the scope of the following claims.

What is claimed is:

1. A method of securing and sealing an optical fiber within a bulkhead, the method comprising:

forming a layer of a solder-compatible material over a diffusion barrier covering a metal-clad optical fiber;

extending the optical fiber through a counterbore in a metallic housing, with a portion of the layer of solder-compatible material within the housing, the housing and the solder-compatible material defining a gap therebetween; and bridging the gap with a solder to secure the fiber to the housing and to form a pressure-tight seal between the fiber and the housing.

2. The method of claim 1, further comprising placing a solder pre-form in the housing.

3. The method of claim 2, further comprising threading the optical fiber through the pre-form.

4. The method of claim 1, further comprising forming a second layer of a solder-compatible material in the housing wherein the second layer of solder-compatible material is secured to the solder bridging the gap to the housing.

5. The method of claim 1, wherein bridging the gap includes resistively heating the solder.

6. The method of claim 5, further comprising ultrasonically cleaning the fiber and the housing after resistively heating the solder.

7. The method of claim 1, further comprising plating a protective layer over the secured optical fiber and housing.

8. A method of securing and sealing an optical fiber within a bulkhead, the method comprising:

forming a layer comprising gold over a barrier comprising nickel covering a gold-plated optical fiber;

placing a solder pre-form comprising silver in a housing;

extending the optical fiber through the housing and the solder pre-form, with a portion of the layer comprising gold within the housing, the housing and the layer comprising gold defining a gap therebetween;

resistively heating the solder pre-form to secure the fiber to the housing and to form a pressure-tight seal between the fiber and the housing; and plating a protective layer comprising gold over the secured optical fiber and housing.

9. An optical feedthrough comprising:

a metallic housing having a counterbore therein;

an optical fiber disposed through the counterbore in the housing, the fiber having, over a length adjacent the housing, a metallic layer covering the optical fiber, a diffusion barrier about the metallic layer, and a layer of a solder-compatible material about the diffusion layer; and a solder disposed in the housing and connecting the fiber to the housing, the solder bridging a gap between the metallic housing and the solder-compatible material to form a pressure-resistant seal about the fiber.

10. The optical feedthrough of claim 9, wherein the metallic layer comprises gold.

11. The optical feedthrough of claim 9, wherein the diffusion barrier includes nickel.

12. The optical feedthrough of claim 9, wherein the solder-compatible material comprises gold.

13. The optical feedthrough of claim 9, wherein the solder includes silver.

14. The optical feedthrough of claim 9, wherein the solder is connected to a layer of a solder-compatible material plated on the housing.

15. The optical feedthrough of claim 14, wherein the solder-compatible material on the housing comprises gold.

16. The optical feedthrough of claim 9, wherein the connected housing and fiber are coated with an exterior protective layer.

17. The optical feedthrough of claim 16, wherein the protective layer comprises gold.

18. The optical feedthrough of claim 9, adapted to be exposed to at least 20,000 psi of pressure across the solder at 300° C. without leakage.

19. An optical feedthrough comprising:

a metallic housing having a counterbore therein;

a gold-plated optical fiber disposed through the counterbore in the housing, the fiber having a nickel layer disposed thereon and a gold layer disposed over the nickel layer; and a silver-containing solder disposed in the housing and connecting the fiber to the housing, the solder bridging a gap between the metallic housing and the gold layer to form a pressure-resistant seal about the fiber.

20. A method of securing and sealing an optical fiber within a bulkhead, the method comprising:

forming a solder-compatible layer over a diffusion barrier covering a coated optical fiber;

placing a solder pre-form in a housing;

extending the optical fiber through the housing and the solder pre-form, with a portion of the solder-compatible layer within the housing, the housing and the solder-compatible layer defining a gap therebetween;

resistively heating the solder pre-form to secure the fiber to the housing and to form a pressure-tight seal between the fiber and the housing.

21. The method of claim 20 further comprising plating a protective layer comprising gold over the secured optical fiber and housing.

22. The method of claim 20 further comprising placing the solder pre-form in a counterbore in the housing.

\* \* \* \* \*